(12) United States Patent
Windsor

(10) Patent No.: US 12,374,144 B2
(45) Date of Patent: Jul. 29, 2025

(54) ARTIFICIAL INTELLIGENCE FOR REAL-TIME E-MAIL SENTIMENT ANALYSIS FOR BRAND PROTECTION

(71) Applicant: Fortinet, Inc., Sunnyvale, CA (US)

(72) Inventor: Carl Mark Windsor, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 411 days.

(21) Appl. No.: 17/491,510

(22) Filed: Sep. 30, 2021

(65) Prior Publication Data

US 2023/0097577 A1    Mar. 30, 2023

(51) Int. Cl.
| | |
|---|---|
| *G06V 30/412* | (2022.01) |
| *G06F 18/2433* | (2023.01) |
| *G06F 21/60* | (2013.01) |
| *G06F 40/242* | (2020.01) |
| *G06F 40/30* | (2020.01) |
| *G06N 5/01* | (2023.01) |
| *H04L 51/224* | (2022.01) |
| *H04L 51/42* | (2022.01) |

(52) U.S. Cl.
CPC ........ *G06V 30/412* (2022.01); *G06F 18/2433* (2023.01); *G06F 21/60* (2013.01); *G06F 40/242* (2020.01); *G06F 40/30* (2020.01); *G06N 5/01* (2023.01); *H04L 51/224* (2022.05); *H04L 51/42* (2022.05); *G06F 2221/2101* (2013.01)

(58) Field of Classification Search
CPC ........ G06F 40/30; G06F 16/285; G06F 16/93; G06F 40/20; G06F 21/554; G06F 40/216; G06F 21/16; G06F 21/60; G06F 21/6245; G06F 18/2431; G06F 40/242; G06F 40/237; G06F 16/24578; G06F 16/248; G06F 16/9535; G06N 5/02; G06N 5/022; G06N 20/00; G06N 5/01; G06N 20/20; G06V 30/416; G06V 30/414; G06V 10/95; G06V 30/412; H04L 51/42; H04L 51/046; G10L 15/22; G10L 25/63; G10L 15/1815; G10L 15/26; G06Q 30/0201
See application file for complete search history.

(56) References Cited

U.S. PATENT DOCUMENTS

| | | | |
|---|---|---|---|
| 2018/0351901 A1* | 12/2018 | Snider | H04L 51/42 |
| 2019/0050875 A1* | 2/2019 | McCord | G06F 40/242 |
| 2020/0167470 A1* | 5/2020 | Kochura | G06N 5/01 |
| 2020/0210490 A1* | 7/2020 | Hutchins | G06V 30/412 |

* cited by examiner

*Primary Examiner* — Kyung H Shin
(74) *Attorney, Agent, or Firm* — Law Office of Dorian Cartwright; Dorian Cartwright

(57) ABSTRACT

An e-mail is detected as being sent or received. The e-mail can be identified as a customer interaction. The e-mail is scanned to determine a sentimental value using artificial intelligence. Responsive to the sentimental value exceeding a sentimental threshold, a network security audit or other action can be performed on the user and the user device using the sentimental value as a factor in determining a security action.

20 Claims, 4 Drawing Sheets

US 12,374,144 B2

ARTIFICIAL INTELLIGENCE FOR REAL-TIME E-MAIL SENTIMENT ANALYSIS FOR BRAND PROTECTION

FIELD OF THE INVENTION

The invention relates generally to computer networking, and more specifically, to real-time e-mail sentimental analysis for brand protection.

BACKGROUND

Most analysis of employee e-mails occurs in batch at periodic intervals, not in real time. Sentimental analysis algorithms can detect mood from electronic interactions such as e-mail content. Further, sentimental analysis algorithms are not geared specifically to employee interactions with customers. Irate customers and vigilante employees are a security risk. The predictive technologies yield limited results in predicting an e-mail tone based on traditional machine rules.

Therefore, what is needed is a robust technique for using artificial intelligence for real-time e-mail sentimental analysis for brand protection.

SUMMARY

These shortcomings are addressed by the present disclosure of methods, computer program products, and systems for using artificial intelligence for real-time e-mail sentimental analysis for brand protection.

In one embodiment, an e-mail is detected as being sent or received. The e-mail can be identified as a customer interaction. The e-mail is scanned to determine a sentimental value using artificial intelligence.

In another embodiment, responsive to the sentimental value exceeding a sentimental threshold, a network security audit or other action can be performed on the user and the user device using the sentimental value as a factor in determining a security action.

Advantageously, network security is improved by pre-emptively identifying internal potential bad actors.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for real-time e-mail sentimental analysis for brand protection. One of ordinary skill in the art will recognize many additional variations made possible by the succinct description of techniques below.

I. Systems for Sentimental Analysis for Brand Protection (FIGS. 1-2)

Figure 1:
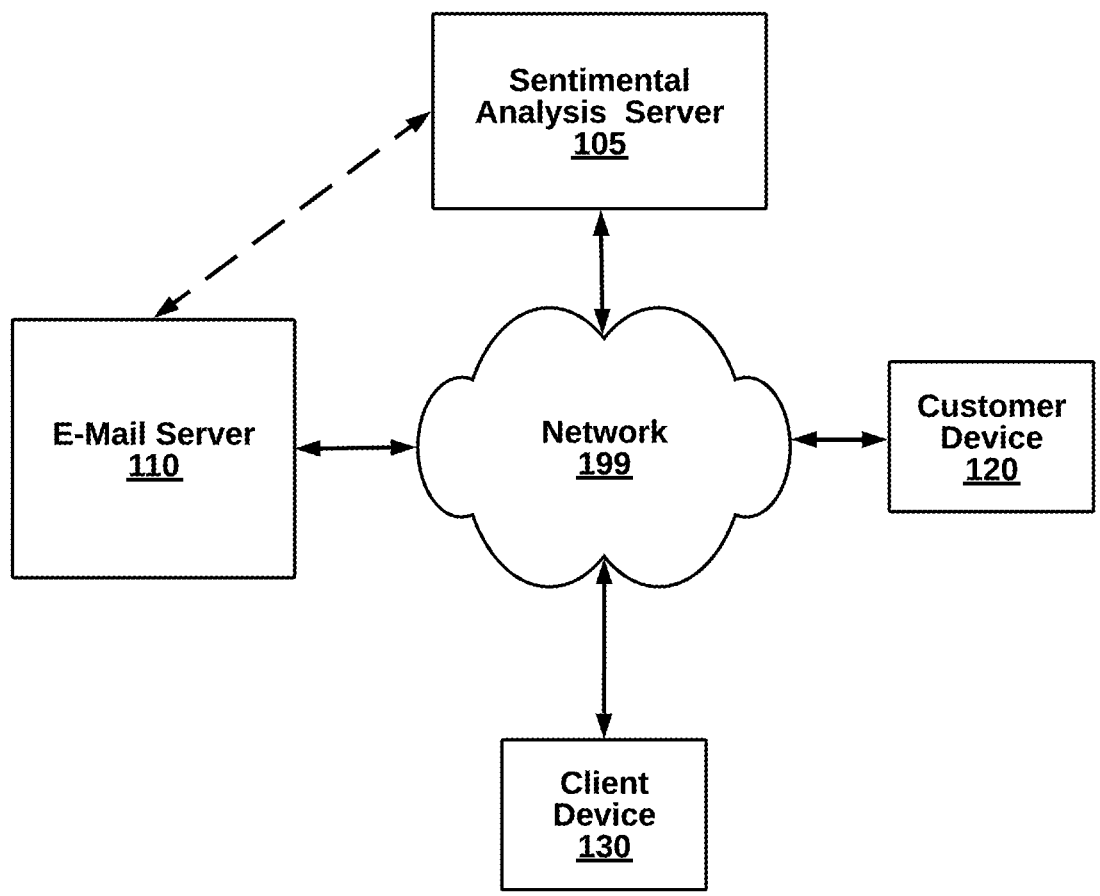
FIG. 1 is a high-level block diagram illustrating a system for real-time e-mail sentimental analysis for brand protection, according to one embodiment.
Figure 2:
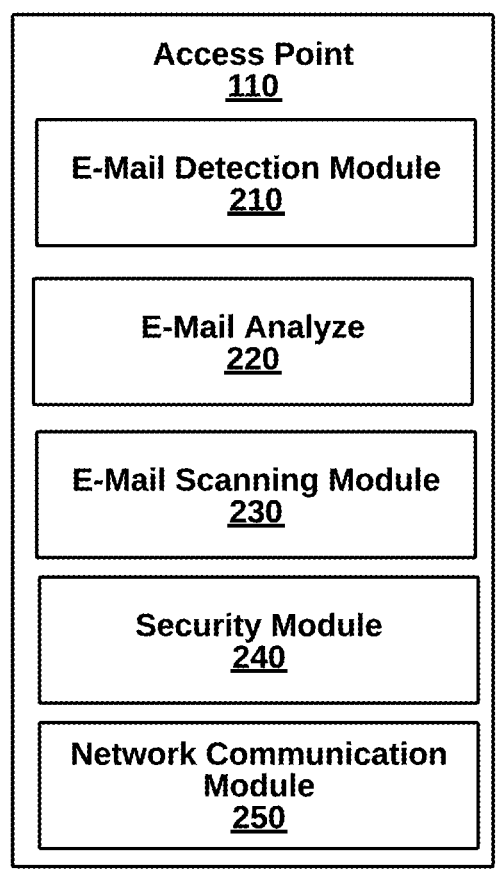
FIG. 2 is a more detailed block diagram illustrating sentimental analysis server of the system of FIG. 1, respectively, according to one embodiment.

FIG. 1 is a high-level block diagram illustrating a system 100 for real-time e-mail sentimental analysis for brand protection, according to one embodiment. The system 100 includes a sentimental analysis server 105, an e-mail server 110, a customer device 120 and a client device 130, coupled through a network 199. Many other embodiments are possible, for example, with more access points, more or fewer stations, additional components, such as firewalls, routers, switches, and the like. Hardware and software components can be implemented similar to the example of FIG. 4.

The wide area network links components of the system 100 with a channel for data communication. The sentimental analysis server 105 and the e-mail server 110 are preferably connected to the wide area network via hardwire. The stations customer device 120 and the client device 130 are likely end points connected either wirelessly or by wire. A wide area network can be a data communication network such as the Internet, a WAN, a LAN, WLAN, can be a cellular network (e.g., 3G, 4G or 5G), or a hybrid of different types of networks. Thus, the system 100 can be a LAN or include cloud-based devices. The radar system 104 is connected by physical interference on Wi-Fi communication channels, but is not directly in data communications with the Wi-Fi network (although there may be some control signals sent over NOP channels).

Figure 4:
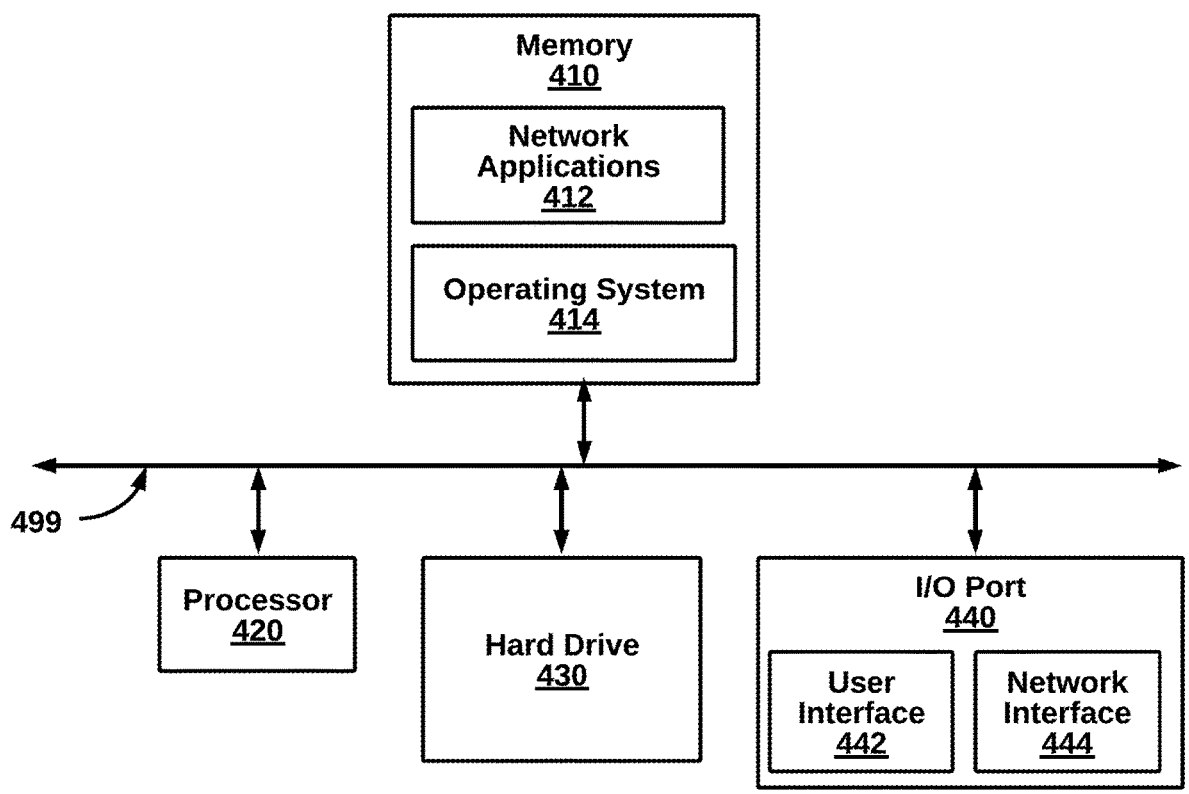
FIG. 4 is a block diagram illustrating an example computing device, according to one embodiment.

The network components of the system 100 can implemented in any of the computing devices discussed herein, for example, a personal computer, a laptop computer, a tablet computer, a smart phone, a smart watch, a mobile computing device, a server, a cloud-based device, a virtual device, an Internet appliance, an IoT (Internet of things) device, or any of the computing devices described herein, using hardware and/or software (see e.g., FIG. 4).

In one embodiment, a sentimental analysis server 105 utilizes artificial intelligence to generate a sentimental value of an e-mail. A set of rules can be applied. The sentimental analysis server 105 can be centrally accessible on an enterprise network to capture a sequence of behaviors at different locations on the network, i.e., at different access points. In some embodiments, e-mails can be flagged to prioritize and identify particularly irate customers. Out of character e-mails from employees can indicate a shift in loyalty and disenchantment. Other e-mails may be appropriate for human resources or compliance officer review.

The e-mail server 110 can communication using APIs to notify the sentimental analysis server 105 of an inbound or outbound e-mail. The e-mail sever 110 can be GMail, Yahoo! Mail, Hotmail, or the like.

The customer device 120 can be a customer interacting with an entity through a web site or a mobile app. An e-mail can be sent through the web site or mobile app, or sent separately from an e-mail account.

The client device 130 can be an employee or other member of an entity interacting with customers, members, potential business, or the like. During an audit, the client device 130 may be scanned for evidence of large file transfers, malicious file activity, and other data. Other e-mails from a particular user can be compared against a current e-mail.

FIG. 2 is a more detailed block diagram illustrating the sentimental analysis server 105 of the system of FIG. 1, respectively, according to one embodiment. The components can be implemented in hardware, software, or a combination of both.

An e-mail detection module 210 detects an e-mail being sent or received. An e-mail analyzer 220 can identify the e-mail as a customer interaction. An e-mail scanning module 230 scans the e-mail to determine a sentimental value using artificial intelligence, including scanning words and phrases. A security module 240, responsive to the sentimental value exceeding a sentimental threshold, performs a network security audit on the user and the user device using the sentimental value as a factor in determining a security action. The network communication module 250 can provide network protocol services and lower layer services for packetizing data according to Ethernet or other protocols. The network communication module 250 can include transceivers with modulators, antennae and drivers to exchange data with a physical medium. An operating system can interface applications executing on stations with network services.

II. Method for Sentimental Analysis for Brand Protection (FIG. 3)

Figure 3:
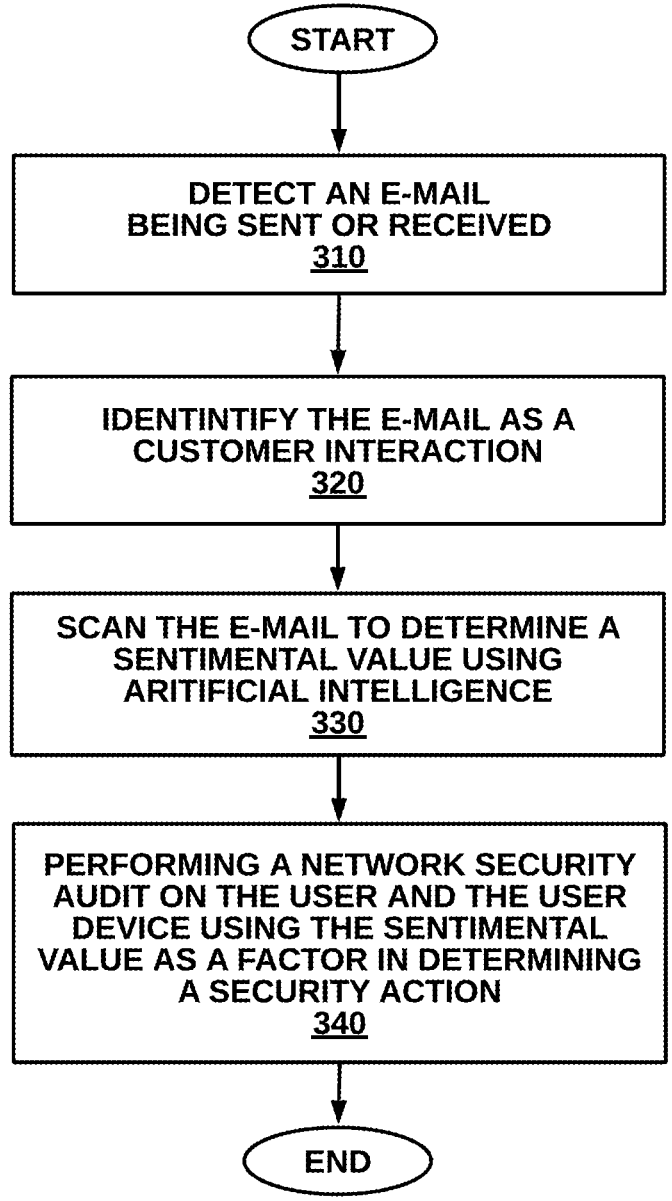
FIG. 3 is a high-level flow diagram illustrating a method for real-time e-mail sentimental analysis for brand protection, according to one embodiment.

FIG. 3 is a high-level flow diagram illustrating a method for real-time e-mail sentimental analysis for brand protection, according to one embodiment. The method 300 can be implemented, for example, by the system 100 of FIG. 1. The steps are merely representative groupings of functionality, as there can be more or fewer steps, and the steps can be performed in different orders. Many other variations of the method 300 are possible.

At step 310, an e-mail is detected as being sent or received. At step 320, the e-mail can be identified as a customer interaction. At step 330, the e-mail is scanned to determine a sentimental value using artificial intelligence. At step 340, responsive to the sentimental value exceeding a sentimental threshold, a network security audit or other action can be performed on the user and the user device using the sentimental value as a factor in determining a security action.

III. Generic Computing Device (FIG. 4)

FIG. 4 is a block diagram illustrating an example computing device 400 for use in the system 100 of FIG. 1, according to one embodiment. The computing device 400 is implementable for each of the components of the system 100. The computing device 400 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 400, of the present embodiment, includes a memory 410, a processor 420, a storage drive 430, and an I/O port 440. Each of the components is coupled for electronic communication via a bus 499. Communication can be digital and/or analog, and use any suitable protocol.

The memory 410 further comprises network applications 412 and an operating system 414. The network applications 412 can include a web browser, a mobile application, an application that uses networking, a remote application executing locally, a network protocol application, a network management application, a network routing application, or the like.

The operating system 414 can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The processor 420 can be a network processor (e.g., optimized for IEEE 802.11, IEEE 802.11AC or IEEE 802.11AX), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 420 can be single core, multiple core, or include more than one processing elements. The processor 420 can be disposed on silicon or any other suitable material. The processor 420 can receive and execute instructions and data stored in the memory 410 or the storage drive 430

The storage drive 430 can be any non-volatile type of storage such as a magnetic disc, EEPROM (electronically erasable programmable read-only memory), Flash, or the like. The storage drive 430 stores code and data for applications.

The I/O port 440 further comprises a user interface 442 and a network interface 444. The user interface 442 can output to a display device and receive input from, for example, a keyboard. The network interface 444 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A computer-implemented method, in a network device upstream of client devices in an enterprise network, the method for real-time e-mail sentimental analysis for brand protection, the method comprising the steps of:
   detecting an e-mail being sent or received;
   identifying the e-mail as a customer interaction;
   scanning the e-mail to determine a sentimental value of an employee through the customer interaction using artificial intelligence; and
   responsive to the sentimental value of the customer interaction exceeding a sentimental threshold, performing a network security audit on the employee and a device of the employee, including capturing a sequence of behaviors for the employee at different locations on the enterprise network; and
   taking a security action based on the network security audit.

2. The method of claim 1, wherein the scanning includes:
   accessing a neural network to compare the e-mail against training from a database of e-mails classified as exceeding the sentimental threshold.

3. The method of claim 1, wherein the step of identifying the e-mail as a customer interaction comprises:
   identifying a customer interaction from e-mail headers including TO, FROM, and SUBJECT headers.

4. The method of claim 1, wherein the step of identifying the e-mail comprises receiving an indication that a file is an e-mail file.

5. The method of claim 1, wherein the step of detecting the e-mail being sent or received comprises receiving a notification from an e-mail server.

6. The method of claim 1, wherein the step of identifying the e-mail as a customer interaction comprises comparing content of the e-mail to a database of classified customer interaction e-mail words and segments.

7. The method of claim 1, wherein the step of performing the network security audit includes scanning for evidence of large file transfers and malicious file activity.

8. The method of claim 1, wherein the step of performing the network security audit includes comparing the e-mail to other e-mails of the employee.

9. A non-transitory computer-readable media storing source code that, when executed by a processor, performs a computer-implemented method, in a network device on a data communication network and implemented at least partially in hardware, for real-time e-mail sentimental analysis for brand protection, the method comprising the steps of:
   detecting an e-mail being sent or received;
   identifying the e-mail as a customer interaction;
   scanning the e-mail to determine a sentimental value of an employee through the customer interaction using artificial intelligence;
   responsive to the sentimental value exceeding a sentimental threshold of the customer interaction, performing a network security audit on the employee and a device of the employee, including capturing a sequence of behaviors for the
   employee at different locations on the enterprise network; and
   taking a security action based on the network security audit.

10. The method of claim 9, wherein the scanning includes:
    accessing a neural network to compare the e-mail against training from a database of e-mails classified as exceeding the sentimental threshold.

11. The method of claim 9, wherein the step of identifying the e-mail as a customer interaction comprises:
    identifying a customer interaction from e-mail headers including TO, FROM, and SUBJECT headers.

12. The method of claim 9, wherein the step of identifying the e-mail comprises receiving an indication that a file is an e-mail file.

13. The method of claim 9, wherein the step of detecting the e-mail being sent or received comprises receiving a notification from an e-mail server.

14. The method of claim 9, wherein the step of identifying the e-mail as a customer interaction comprises comparing content of the e-mail to a database of classified customer interaction e-mail words and segments.

15. The method of claim 9, wherein the step of performing the network security audit includes scanning for evidence of large file transfers and malicious file activity.

16. The method of claim 9, wherein the step of performing the network security audit includes comparing the e-mail to other e-mails of the employee.

17. The method of claim 9, wherein the scanning includes:
    accessing a neural network to compare the e-mail against training from a database of e-mails classified as exceeding the sentimental threshold.

18. A network device upstream of client devices in an enterprise network for real-time e-mail sentimental analysis for brand protection, the Wi-Fi controller comprising:
    a processor;
    a communication interface communicatively coupled to the enterprise network; and
    a storage device communicatively coupled to the processor and storing modules, comprising:
    an e-mail detection module to detect an e-mail being sent or received;
    an e-mail analyzer to identify the e-mail as a customer interaction;
    an e-mail scanning module to scan the e-mail to determine a sentimental value of an employee through the customer interaction using artificial intelligence, including scanning words and phrases; and
    a security module to, responsive to the sentimental value exceeding a sentimental threshold of the customer interaction, perform a network security audit on the employee and a device of the employee, including capturing a sequence of behaviors for the employee at different locations on the enterprise network,
    wherein the security module takes a security action based on the network security audit.

19. The network device of claim 18, wherein the step of performing the network security audit includes scanning for evidence of large file transfers and malicious file activity.

20. The network device of claim 18, wherein the step of performing the network security audit includes comparing the e-mail to other e-mails of the employee.

\* \* \* \* \*